Dec. 21, 1937. M. P. MOSESIAN Re. 20,598

PACKING CONTAINER

Original Filed Feb. 15, 1932 2 Sheets-Sheet 1

INVENTOR.
Moses P. Mosesian
BY
White, Pratt, Flehr & Lothrop
ATTORNEYS.

Dec. 21, 1937. M. P. MOSESIAN Re. 20,598

PACKING CONTAINER

Original Filed Feb. 15, 1932 2 Sheets-Sheet 2

INVENTOR.
Moses P. Mosesian
BY
White, Post, Fleh & Lothrop
ATTORNEYS.

Reissued Dec. 21, 1937

Re. 20,598

UNITED STATES PATENT OFFICE 20,598

PACKING CONTAINER

Moses P. Mosesian, Fresno, Calif.

Original No. 1,933,869, dated November 7, 1933, Serial No. 592,918, February 15, 1932. Application for reissue July 5, 1935, Serial No. 29,894

4 Claims. (Cl. 217—40)

My invention relates generally to devices for packing and shipping food products and more particularly relates to containers for packing and shipping fresh fruits such as grapes, plums, pears and citrus fruits.

Some of the important factors controlling the proper construction of containers for shipping fresh fruits and the like are:—strength to withstand more or less rough handling of the container during shipment; simplicity and economy of construction; design for protection of the fruit from bruising; and ventilation to insure preservation of the pack.

While some of the above mentioned factors have been taken into account in the construction of many of the present type of packing containers, others of these controlling factors have been either overlooked entirely or have been sacrificed in attaining but one of the desired results. In other words, in present packing containers, strength, and simplicity and economy of construction have been stressed, while protection from bruising of the pack and ventilation thereof have been ignored. In other containers, while one or both of the latter factors may have been considered to some extent, the others have been overlooked. Due to the lack of attention to all of these vital factors, the use of present packing containers, in general, has resulted either in damage or spoilage of the pack in shipment or damage of such extent to the container that the pack is strewn about.

Broadly, it is an object of my invention to provide a packing container which is particularly adapted for the shipping of fresh fruit and which affords proper ventilation of the pack so as to insure preservation thereof during the entire shipment; which avoids bruising of the pack during handling thereof; and which is ruggedly yet inexpensively manufactured.

Other objects of the invention, together with some of the advantageous features thereof, will be set forth in the following description of the preferred embodiments of the invention which are illustrated in the accompanying drawings:

Referring to the drawings.

Figure 1:
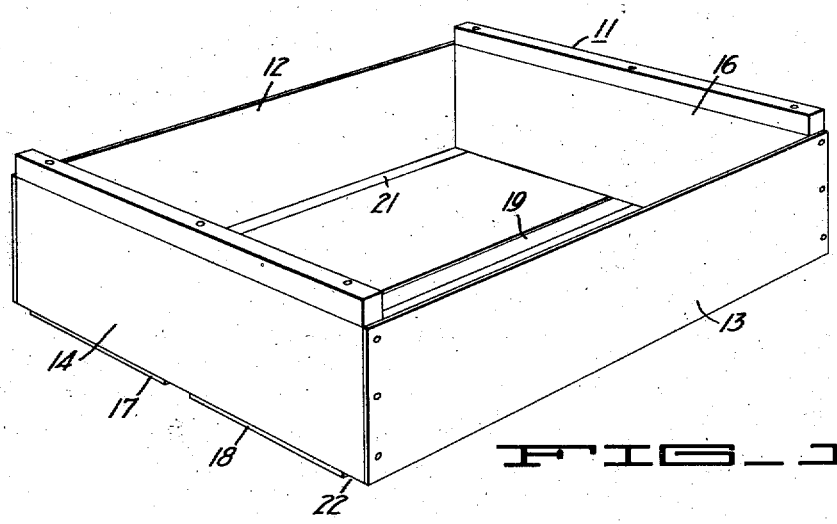
Figure 1 is a perspective of a part of an embodiment of my invention.

In its preferred form, the packing container of my invention preferably comprises a receptacle in the form of a rectangular box having an apertured bottom and apertured side walls together with a pack carrying insert or liner engaging and cooperating with the inner faces of the walls and bottom of the box to provide an interior continuous passageway which communicates with the exterior of the box and with the interior of said liner, and extensions on said liner projecting from the walls of the receptacle to hold the pack out of contact with the upper edges of said walls.

While the receptacle of my invention can be the standard lug box employed in shipping fruits, provided with holes in the bottom and side walls thereof, I preferably provide a receptacle, generally designated as 11, which is somewhat similar to the conventional lug box and which includes a pair of side walls 12 and 13 and a pair of end walls 14 and 16. However, the preferred embodiment of the receptacle 11 of my invention differs from the standard lug box in that it includes a bottom made of a plurality of spaced slats 17 and 18 which span the end walls 14 and 16 and which preferably are spaced from the side walls 12 and 13 to provide longitudinally extending apertures 19, 21 and 22 in the bottom between the slats 17 and 18 and adjacent to the side walls 12 and 13 respectively. It should be observed also that the end walls 14 and 16 are constructed so as to project above the side walls 12 and 13 so that upon fitting a lid 23 to the receptacle, longitudinally extending apertures 24 and 25 are provided in the side walls adjacent to the lid.

The combination of my invention includes a liner or insert 26, which engages the inner faces of the side walls 12 and 13, end walls 14 and 16, and the bottom of the box and in which the pack is disposed. The insert 26 conveniently can be fabricated of a single sheet although it can be formed of a plurality of sheets, if desired. Preferably I employ a single sheet or a plurality of sheets of fibrous material, but the sheet or sheets utilized can be any suitable material, such as veneer. If veneer is employed as the material for the insert 26, the veneer must be worked, as is well known, under a moist condition in order to form the insert.

Figure 2:
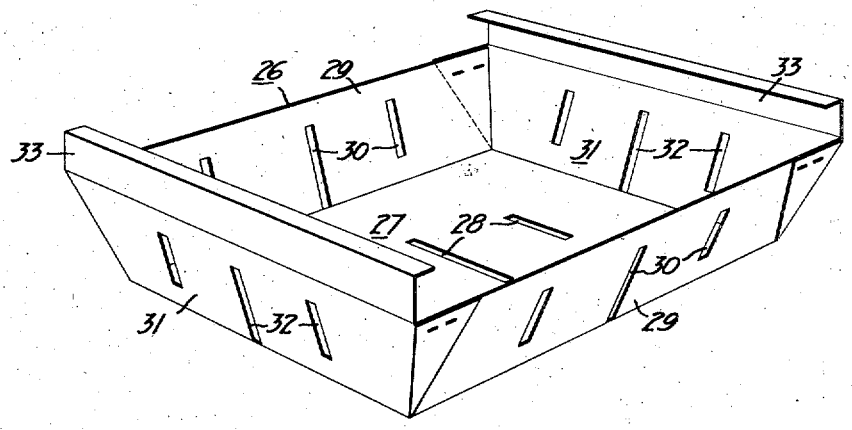
Figure 2 is a perspective of an embodiment of another element of the invention.
Figure 6:
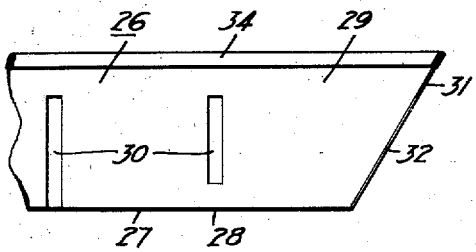
Figure 6 is a partial elevation of a modified embodiment of the element of my invention which is shown in Figure 2.
Figure 3:
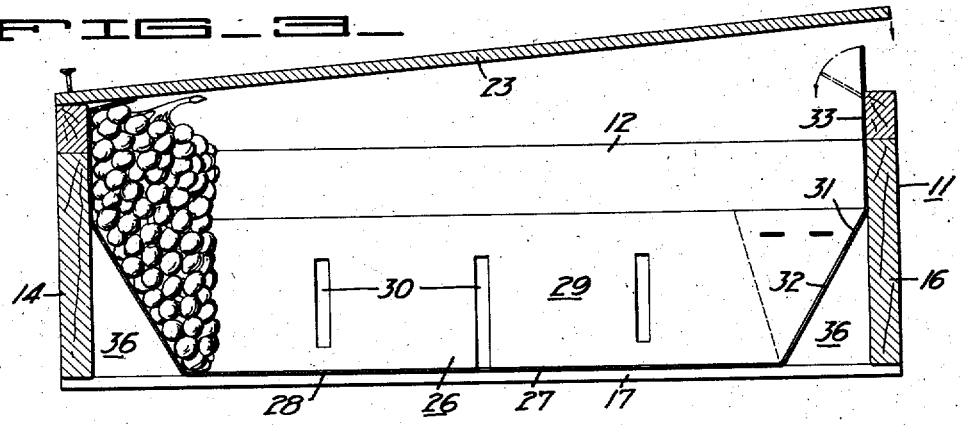
Figure 3 is a side elevation, in cross section, of an entire embodiment of the invention illustrating a bunch of grapes substantially in packed position.
Figure 4:
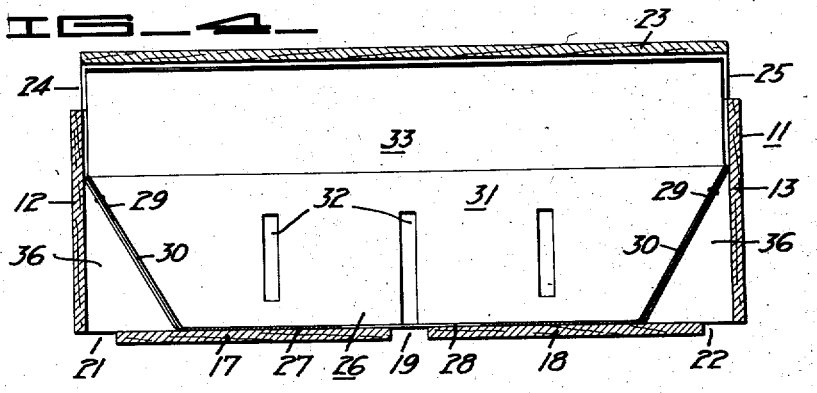
Figure 4 is an end elevation, in cross section, of the embodiment of my invention which is shown in Figure 3.
Figure 5:
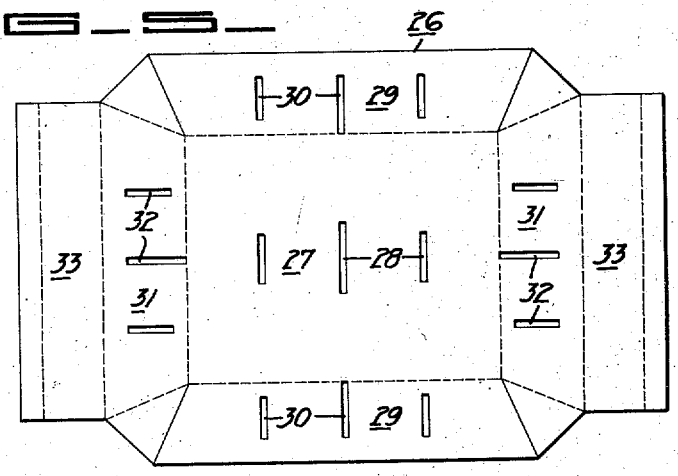
Figure 5 is a development of the element of the invention which is illustrated in Figure 2.

A development of the preferred embodiment of the insert is illustrated in Figure 5. It is to be noted that a sheet is or sheets are so stamped from a supply of the material and scored and cut along the dotted and solid lines respectively that, upon folding the sheet or sheets, the insert 26 which is formed preferably includes a base or bottom panel 27 corresponding to the shape of but considerably smaller than the bottom of the box having a plurality of slots 28 therein, a pair of inclined side walls 29 having a plurality of slots 30 therein, and a pair of inclined end walls 31 having slots 32 therein and also provided with extensions 33. An insert of this character shown pre-erected and fastened at the corners, is illustrated in Figure 2 of the drawings, and, as above stated, preferably is formed of a sheet or a plurality of sheets of fibrous material such as cardboard. This form permits the liner to be placed into the box like a basket, but it is also evident that the stamped flat blank of Fig. 5 may be simply laid across the top of the box and pushed down into place, as its construction makes it self-centering. Should it be desired to provide a veneer insert, a sheet or sheets of veneer can be stamped in substantially the same manner as when employing fibrous material in that the stamping can be such as to provide an insert 26 with inclined slotted side and end walls. In the veneer modification, I have found it desirable to line the upper edges of the inclined walls of the veneer insert with a reinforcing strip 34 of any suitable metal, such as tin, to prevent splitting of the veneer adjacent the slots in the walls. (See Figure 6.)

In operative position, the bottom 27 of the insert 26 rests upon the bottom of the receptacle 11, with the slots 28 of the bottom 27 registering with the longitudinally extending apertures 19 between the spaced slats 17 and 18 of the receptacle bottom, and the upper edges of the inclined side and inclined end walls 29 and 31 respectively of the insert 26 engage respectively the side and end walls of the receptacle. Further, the extensions 33 of the inclined end walls of the insert project above the end walls of the receptacle 11 and can be folded against the pack to hold the same out of contact with the upper edges of the receptacle end walls. The provision of the extension 33 on the insert 26 is advantageous in that the extensions protect the pack from becoming smashed or bruised upon placing a lid upon the receptacle prior to the shipment of the fruit.

The engagement of the insert 26 with the receptacle 11 affords, due to the inclination of the side and end walls of the insert, a continuous passageway 36 within the receptacle which is substantially bounded by the insert and by the bottom, side and end walls of the receptacle. It is to be understood, of course, that the angles between the bottom 27 and the end and side walls of the insert can be of any desired sizes to effect the desired inclination of the side and end walls thereof. The construction of the bottom of the receptacle 11, as well as the entire insert, and the engagement of the insert with the receptacle is such that the passageway 36 communicates not only with the exterior of the receptacle through the apertures 19, 21 and 22 of the bottom, but also communicates with the interior of the insert through the slotted walls thereof. Thus, ventilation for the pack is amply afforded in the container of my invention, for, in addition to providing for the admission of air into the container at the base of the pack through the apertures 19 and slots 28, admission of air at the top of the pack through the longitudinally extending apertures in the sides of the receptacle 11 adjacent to the lid 23, I also provide for continuous circulation of air about the pack by means of the interior passageway 36 which communicates with the apertures 19, 21 and 22 of the receptacle and slots 30 and 32 of the insert.

A packing container constructed in accordance with the foregoing specification not only affords ample ventilation for the pack, thereby insuring preservation of the fruit in its natural condition during the entire shipment thereof, but also affords complete protection from bruising of the pack and provides a container which can be inexpensively manufactured and which is sufficiently rugged to withstand severe handling.

While I have shown the preferred embodiments of my invention in the drawings, it is to be understood that I am not to be limited to the embodiment illustrated as my invention, as defined by the appended claims, can be embodied in a plurality and variety of forms.

I claim:

1. A packing container for use in shipping fresh fruits comprising a receptacle including a lid, a bottom having a plurality of apertures therein, a pair of side walls and a pair of end walls joining and projecting above said side walls; said lid together with said side walls forming apertures for the passage of air currents, and an insert engaging said bottom, said side walls and said end walls; said insert including a pair of inclined slotted ends and a pair of inclined slotted sides to provide, in conjunction with said receptacle, a continuous passageway within said container communicating with the exterior thereof through the apertures in said bottom and with the interior of the insert through said slotted ends and said slotted sides whereby said fruit is subjected to circulating air, said insert also including extensions on said inclined ends each of which is foldable upon itself so as to overlie a portion of the receptacle adjacent an end wall to protect the contents of the container from being crushed against an end wall upon fitting a lid to the receptacle.

2. A container for use in shipping grapes or the like comprising a receptacle having a lid, a pair of ends, an apertured bottom and side walls; said lid together with said side walls forming apertures for the passage of air currents, means for carrying the grapes, said means engaging the inner faces of the walls, ends and bottom of the receptacle, a passageway within said receptacle substantially bounded by said means and by the ends, walls and bottom of the receptacle; said passageway communicating with the exterior of the receptacle through said apertured bottom and communicating also with the interior of said means, and extensions on said means projecting from the ends of the receptacle and adapted to be folded to keep the grapes out of contact with said ends when the lid is fastened upon the receptacle.

3. A packing container for use in transporting fresh fruits such as grapes and the like comprising an apertured bottom, a pair of side walls, a pair of ends walls; said end walls projecting above said side walls, a lid; said lid together with said side walls forming apertures adjacent the top of the container for the passage of air currents, and a fruit carrier engaging the interior surfaces of the end walls, bottom and side walls of the container, said carrier comprising a single sheet of material adapted to be folded upon itself to form a receptacle including an apertured base, a pair of apertured side walls and a pair of apertured end walls; said walls being inclined and cooperating with the walls of the container to provide an unobstructed, closed passageway within and about the container which communicates with the exterior thereof through said apertured bottom as well as with the interior of the carrier through the apertured end and side walls thereof whereby air currents can freely circulate over and around the contents of the carrier; said end walls of said carrier projecting above the walls of the container and adapted to be folded over the contents of the carrier to prevent crushing of the contents thereof upon fastening the lid to the container.

4. A ventilating liner for a rectangular wooden fruit box especially adapted for the shipping of grapes, said liner initially consisting of a flat sheet of relatively stiff fibrous material such as cardboard, stamped, scored and cut to define thereon a rectangular apertured bottom panel much smaller than the inside of the wooden box in which it is to be used, and apertured side walls connected to the bottom panel and adapted to slant outwardly and upwardly to engage the upper inside portions of the box walls respectively when the bottom panel of the liner is seated within the box so as to form a continuous ventilating passage entirely around the box between the liner and the box walls, the apertures in both bottom panel and side walls of the liner adapted to cooperate with openings in the wooden box to insure circulation of air.

MOSES P. MOSESIAN.